United States Patent [19]
Itoh et al.

[11] Patent Number: 6,001,445
[45] Date of Patent: Dec. 14, 1999

[54] SIMULATION DISK FOR MEASURING FLYING HEIGHT OF A MAGNETIC HEAD

[75] Inventors: Kazuhiro Itoh; Naoyuki Goto, both of Sagamihara, Japan

[73] Assignee: Kabushiki Kaisha Ohara, Japan

[21] Appl. No.: 09/076,932

[22] Filed: May 13, 1998

[51] Int. Cl.$^6$ ..................................................... B32B 3/00

[52] U.S. Cl. ..................... 428/64.1; 428/64.2; 428/64.4; 428/65.3; 428/702; 428/913

[58] Field of Search .................................. 428/64.1, 64.2, 428/64.4, 65.3, 689, 702, 913

[56] References Cited

U.S. PATENT DOCUMENTS

| | | | |
|---|---|---|---|
| 5,757,492 | 5/1998 | Tokutomi | 356/357 |
| 5,789,756 | 8/1998 | Guzik | 250/559.29 |
| 5,831,733 | 11/1998 | De Groot | 356/369 |

*Primary Examiner*—Elizabeth Evans
*Attorney, Agent, or Firm*—Hedman, Gibson & Costigan, P.C.

[57] ABSTRACT

A transparent simulation disk for measuring flying height of a magnetic head (i.e., distance between a magnetic head and a magnetic disk such as a hard disk of a computer) in place of a magnetic disk is made of a $SiO_2$—$R_2O$ (where R is Li, Na or K) glass or glass-ceramic having electric resistivity of $10^8$–$10^{14}$ $\Omega$cm and abrasion of 90 or below.

4 Claims, No Drawings

SIMULATION DISK FOR MEASURING FLYING HEIGHT OF A MAGNETIC HEAD

BACKGROUND OF THE INVENTION

This invention relates to a transparent simulation disk used in place of a magnetic disk for measuring flying height, i.e., distance between a magnetic head and an information storage magnetic disk such as a hard disk or a removable disk for a computer.

In the semiconductor industry, there has recently been a rapid increase in recording density of a magnetic disk used as a hard disk. The increase in the recording density necessitates reduction in flying height of a magnetic head, i.e., distance between the magnetic head and the disk and nowadays the flying height is approaching a range of about 25 nm to 50 nm. Manufacturers of magnetic disks and manufacturers of hard disk drives conduct measurement of flying height by employing a method measuring interference of incident beam or by other method, using a transparent simulation disk instead of a magnetic disk. This transparent simulation disk consists merely of a substrate made of glass or quartz glass and, therefore, it has a high electric resistance and tends to be charged with electricity. As the accumulated charge increases, the Coulomb's force acting between the magentic head and the simulation disk (in this case the attraction force) increases as shown by the equation $F = k \times q_1 \times q_2/r^2$ (where F represents the Coulomb's force, k proportional constant, $q_1$, $q_2$ amount of electric charge, and r distance). By the Coulomb's force, an error tends to occur in the measured flying height and further increase in the electric charge causes even crash of the magnetic head against the surface of the simulation disk. If the magnetic head is brought into contact with the transparent simulation disk during a flying height test, the electric charge on the simulation disk flows as a current into the magnetic head and Joule heat generated by this current causes damage to the magnetic head which prevents continuation of the flying height test.

As described above, the recent tendency toward a high recording density of a magnetic medium demands a lower flying height. Since the Coulomb's force acting between the magnetic head and the simulation disk is in inverse prorpotion to the square of distance between the magnetic head and the simulation disk, there is an increasing tendency to occurrence of an error in measurement of flying height and crash of the magnetic head caused by the Coulomb's force produced by the electric charge accumulated on the simulation disk. Reduction of the electric charge therefore is a serious problem to be solved in the simulation disk.

In a prior art device disclosed by Japanese Patent Application Laid-open No. Hei 3-3177, for example, flying height of a magnetic head is measured by utilizing ultraviolet ray or visible ray. Since electric resistivity of a transparent simulation disk of this device is about $10^{15}$–$10^{16}$ Ωcm or over, electric charge is accumulated on the transparent simulation disk and damage of the magnetic head used in the flying height test is caused by charging of the accumulated charge. Since, moreover, voltage at the charging tends to decrease as the flying height decreases, damage rate of the magnetic head tends to increase. This problem is considered to be caused by the fact that the prior art transparent simulation disk has a very high value of electric resistance.

For reducing electric resistance of the surface of a simulation disk, it is proposed to form a conductive thin film on the simulation disk by employing a thin film forming technique including CVD, PVD, sputtering and vacuum deposition. This method is effective in reducing accumulation of electric charge by grounding this conductive thin film and thereby reducing damage to the flying height testing magnetic head occurring due to current flowing when the magnetic head comes into contact with the disk. This method is effective also for preventing accumulation of dust on the disk. This method, however, is disadvantageous in that the thin film reduces light transmittance and also the border between the thin film and the glass substrate exercises an adverse optical effect and, accordingly, an error in measurement tends to occur. Moreover, the thin firm is likely to come off when the magnetic head comes into contact with the disk.

It is, therefore, an object of the invention to provide a transparent similation disk for measuring flying height of a magnetic disk having sufficient conductivity in the substrate of the simulation disk and thereby being capable of preventing accumulation of dust and damage to the magnetic head caused by flow of current due to accumulated charge when the magnetic head comes into contact with the disk, having also transmittance and homogeneity equal to prior art transparent simulation disks (which have no conductive thin film) and a high resistance to abrasion.

SUMMARY OF THE INVENTION

For achieving the above described object of the invention, study and experiments made by the inventors of the present invention have resulted in the finding, which has led to the present invention, that all the problems of the prior art methods have been solved by employing a transparent simulation disk made of a $SiO_2$—$R_2O$ glass or glass-ceramic having electric resistivity of $10^8$ Ωcm to $10^{14}$ Ωcm and abrasion of 90 or below.

A simulation disk for measuring flying height of a magnetic head achieving the above described object of the invention comprises a $SiO_2$—$R_2O$ (where R is Li, Na or K) glass or glass-ceramic having electric resistivity of $10^8$–$10^{14}$ Ωcm and abrasion of 90 or below.

In one aspect of the invention, the simulation disk for measuring flying height of a magnetic head is made of glass consisting in weight percent of:

| | |
|---|---|
| $SiO_2$ | 40–85% |
| $R_2O$ (R being Li, Na or K) | 2–30% |
| $P_2O_5$ | 0–15% |
| $B_2O_3 + Al_2O_3$ | 0–35% |
| R'O (R' being Mg, Ca, Sr. Ba, Zn or Pb) | 0–35% |
| $TiO_2 + ZrO_2$ | 0–10% |
| $As_2O_3 + Sb_2O_3$ | 0–2% |
| $La_2O_3 + Y_2O_3 + Gd_2O_3 + Bi_2O_3$ | 0–10% | and has electric resistivity of $10^8$ Ωcm to $10^{14}$ Ωcm and abrasion of 90 or below.

In another aspect of the invention, the simulation disk for measuring flying height of a magnetic head is made of a transparent glass-ceramic consisting in weight percent of:

| | |
|---|---|
| $SiO_2$ | 48–65% |
| $P_2O_5$ | 0–15% |
| where $SiO_2 + P_2O_5$ | 50–70% |
| $Al_2O_3$ | 15–30% |
| $Li_2O$ | 2–10% |
| MgO | 0–8% |
| ZnO | 0–8% |
| CaO | 0–8% |
| BaO | 0–7% |

-continued

| | |
|---|---|
| TiO$_2$ | 0–7% |
| ZrO$_2$ | 0–7% |
| where TiO$_2$ + ZrO$_2$ | 0.5–10% |
| As$_2$O$_3$ + Sb$_2$O$_3$ | 0–2% | and has electric resistance of $10^8$ Ωcm to $10^{13}$ Ωcm and abrasion of 75 or below.

In another aspect of the invention, the simulation disk for measuring flying height of a magnetic head made of a transparent glass-ceramic is obtained by melting glass materials of said composition, forming and annealing a molten glass and heat treating the molten glass for nucleation under a temperature within a range from 650° C. to 750° C. and for subsequent crystallization under a temperature within a range from 750° C. to 850° C., said glass-ceramic having electric resistivity of $10^8$ Ωcm to $10^{13}$Ω cm and abrasion of 75 or below.

DETAILED DESCRIPTION OF THE INVENTION

The material used for the simulation disk according to the invention is a SiO$_2$—R$_2$O glass or glass-ceramic. A SiO$_2$ glass has high strength, resistance to abrasion and chemical stability and durability and therefore has sufficient mechanical factors as a simulation disk achieving the object of the present invention. However, the SiO$_2$ glass has a high electric resistance and, for this reason, cannot be employed as a simulation disk which has solved the problems to be solved by the invention. In the present invention, the SiO$_2$ glass has been modified by adding the R$_2$O ingredient to reduce electric resistance. The R$_2$O ingredient, i.e., alkali ingredient, is effective for reducing electric resistance of glass. It is preferable, if possible, to use a single alkali ingredient to reduce electric resistance from the standpoint of preventing an adverse mixed alkali effect caused by adding a plurality of alkali ingredients.

It is essential that electric resistivity should be within a range from $10^8$ Ωcm and $10^{14}$ Ωcm. If electric resistivity is larger than $10^{14}$ Ωcm, damage to the magnetic head due to accumulated charge as described above takes place. If electric resistivity is smaller than $10^8$ Ωcm, this necessitates addition of a large amount of the alkali ingredient in the glass which significantly deteriorates strength, durability, resistance to abrasion and chemical stability. A preferable range of electric resistance is $10^8$–$10^{13}$ Ωcm and more preferable range is $10^8$–$10^{12}$ Ωcm.

As regards abrasion, if abrasion exceeds 90, the surface of the simulation disk is scraped off by the magnetic head which comes into frictional contact with the surface of the simulation disk with the result that, as measurement proceeds, a measurement error increases because flatness of the surface of the simulation disk is reduced and a powdery scraped off portion of the disk surface is produced. A preferable range of abrasion is 75 or below and a more preferable range of abrasion is 70 or below.

The claimed composition range of the glass used for the simulation disk of the present invention is determined for the following reasons.

The SiO$_2$ ingredient is a principal ingredient of the glass. If the amount of this ingredient is below 40%, glassifying of the glass materials becomes difficult whereas if the amount of this ingredient exceeds 85%, difficulty arises in melting and refining of the glass and, moreover, optical homogeneity, durability, chemical stability and resistance to abrasion as well as mechanical strength are deteriorated. A preferable range of this ingredient is 48–80% and a more preferable range thereof is 48–70%.

The R$_2$O ingredient is effective for reducing electric resistivity as described before. Li, Na and K are found to be particularly effective and Li is the most effective of them. If the amount of this ingredient is below 2%, a desired electric resistivity cannot be obtained whereas if the amount of this ingredient exceeds 30%, chemical durability, resistance to abrasion and mechanical strength are deteriorated. Preferable ranges are 0–15% for Li$_2$O, 0–30% for Na$_2$O and 0–30% for K$_2$O but the total amount of Li$_2$O, Na$_2$O and K$_2$O should be within a range of 2–30% and, more preferably within a range of 5–30%.

The B$_2$O$_3$ ingredient plays a role of forming a network structure of the glass and reducing coefficient of thermal expansion. The Al$_2$O$_3$ ingredient is effective for improving chemical durability, mechanical strength and resistance to abrasion.

These two ingredients are selected depending upon properties (transmittance, thermal expansion coefficient and mechanical strength etc. ) of a glass to be obtained within a range of B$_2$O$_3$+Al$_2$O$_3$=0–35%. If the total amount of these ingredients exceeds 35%. resistivity to devitrification is reduced. If the amount of the B$_2$O$_3$ ingredient exceeds 20%, chemical durability is deteriorated. If the amount of the Al$_2$O$_3$ ingredient exceeds 30%, electric resistance increases. Therefore, a preferable range of the B$_2$O$_3$ ingredient is 0–20% and a preferable range of the Al$_2$O$_3$ ingredient is 0–30% and a preferable range of the total amount of B$_2$O$_3$ and Al$_2$O$_3$ ingredients is 2–35%, and more preferably, 2–30%.

The R'O ingredient (where R' is Mg, Ca, Sr, Ba, Zn or Pb) may be added for improving resistivity to devitrification . If the amount of this ingredient exceeds 35%, chemical durability and melting property of the glass are deteriorated and devitrification increases rather than decreases due to the excessive addition.

These R'O ingredients can be selected depending upon properties of the glass required. The MgO ingredient is effective for improving resistivity to devitrification. If the amount of this ingredient exceeds 10%, devitrification increases rather than decreases. This ingredient therefore should be added in the amount not exceeding 10%. The ZnO ingredient is effective for decreasing thermal expansion coefficient and improving chemical durability of the glass. If the amount of this ingredient exceeds 30% resistivity to devitrification decreases. This ingredient therefore should be added in the amount not exceeding 30% and, preferably 8% or below. The CaO, BaO and SrO ingredients have effects and properties similar to ZnO and may be added in the amount not exceeding 30% respectively. The PbO ingredient is effective for improving melting property of the glass but this effect can be satisfied by the other ingredients of the glass. From the above, a desirable range of the total amount of these six ingredients is 0–35%. Preferable ranges of the individual ingredients are 0–10% for MgO, 0–30% for CaO, 0–30% for SrO, 0–30% for BaO, 0–30% for ZnO, 0–35% as the total amount of the R'O ingredients. More preferable ranges of these ingredients are 0–8% for MgO, 0–20% for CaO, 0–20% for SrO, 0–20% for BaO and 0–20% for ZnO and 0–30% as the total amount of the R'O ingredients.

The P$_2$O$_5$ ingredient is effective, like Sb$_2$O$_3$, for forming a network structure of the glass and refining the glass. If the amount of this ingredient exceeds 15%, transmittance is significantly deteriorated. A preferable range of this ingredient is 0–10% and a more preferable range thereof is 0–7%.

The $TiO_2$ ingredient is effective for reducing thermal expansion coefficient and the $ZrO_2$ ingredient is effective for improving mechanical strength. If the total amount of these ingredients exceeds 10%, difficulty arises in glassifying of the glass materials. A preferable range of the $TiO_2$ ingredient is 0–6% and a preferable range of the $ZrO_2$ ingredient is 0–6% and a preferable range of the total amount of these ingredients is 0–8%.

The $As_2O_3$ and/or $Sb_2O_3$ ingredients may be added as a refining agent. The total amount of these ingredients up to 2% will suffice.

The $La_2O_3$, $Y_2O_3$, $Gd_2O_3$ and $Bi_2O_3$ ingredients are effective for improving chemical durability. If the total amount of these ingredients exceeds 10%, resistivity to devitrification is sharply deteriorated. A preferable range of the total amount of these ingredients is 0–8% and a more preferable range thereof is 0–6%.

The claimed composition range of the transparent glass-ceramic used for the simulation disk of the invention is determined for the following reasons.

The $SiO_2$ ingredient is a principal ingredient in this glass-ceramic as in the previously described glass. If the amount of this ingredient is below 48%, crystal grains of the glass-ceramic obtained tend to become coarse with resulting decrease in transmittance. If the amount of this ingredient exceeds 65%, difficulty arises in refining during melting of materials with resulting decrease in optical homogeneity. A preferable range of this ingrdient is 50–63% and a more preferable range thereof is 53–60%.

The $P_2O_5$ ingredient is effective for improving refining of the base glass. If the amount of this in gredient exceeds 15%, crystal grains of the glass-ceramic obtained tend to become coarse with resulting descrease in transmittance. A preferable range of this ingredient is 0–10%.

For improving the above described effects, a preferable range of the total amount of the $SiO_2$ and $P_2O_5$ ingredients is 50–70% and a more preferable range thereof is 55–70%.

The $Al_2O_3$ ingredient is effective for preventing devitrification and improving chemical durability, mechanical strength and abrasion. If the amount of this ingredient is below 15%, the desired effect cannot be obtained whereas if the amount exceeds 30%, the desired electric resistivity cannot be obtained. A preferable range of this ingredient is 20–28% and a more preferable range thereof is 20–25%.

The $Li_2O_3$ ingredient is effective for reducing electric resistivity in the same manner as in the previously described glass. This ingredient is also a constituent element of β-quartz or β-quartz solid solution. If the amount of this ingredient is below 2%, the desired electric resistivity cannot be obtained whereas if the amount of this ingredient exceeds 10%, crystal grains of the glass-ceramic obtained tend to become coarse with resulting descrease in transmittance. A preferable range of this ingredient is 2–8% and a more preferable range thereof is 3–7%.

The MgO ingredient may be added for improving resistivity to devitrification and improving transmittance. If the amount of this ingredient exceeds 8%, a desired crystal grain cannot be obtained. A preferable range of this ingredient is 0–6% and a more preferable range thereof is 0–5%.

The ZnO ingredient may be added for obtaining a glass-ceramic of a desired crystal grain. If the amount of this ingredient exceeds 8%, a desired crystal grain cannot be obtained and, besides, resistivity to devitrification is sharply deteriorated. A preferable range of this ingredient is 0–6% and a more preferable range thereof is 0–5%.

The CaO and BaO ingredients are important as ingredients for performing fine adjustment of a glass matrix portion other than a crystal portion in the glass-ceramic obtained. If the amount of the CaO ingredient exceeds 5%, and the amount of the BaO exceeds 7%, resistivity to devitrification is deteriorated. Further, if the amount of the BaO ingredient exceeds 7%, the melting property of the glass is deteriorated. A preferable range is 0.2–4.5% for the CaO ingredient and 0.2–6% for the BaO ingredient. A more preferable range is 0.5–4% for the CaO ingredient and 0.5–5% for the BaO ingredient.

The $TiO_2$ and $ZrO_2$ ingredients function as a nucleating agent in forming the glass-ceramic and it is essential to add at least one of these ingredients. Further, the $TiO_2$ ingredient is effective for decreasing thermal expansion coefficient and the $ZrO_2$ ingredient is effective for improving mechanical strength. If the amounts of these ingredients respectively exceed 7%, transmittance and resistivity to devitrification of the glass-ceramic are deteriorated. A preferable range of these ingredients is 0.5–6% and a more preferable range thereof is 0.5–5%.

The $As_2O_3$ and/or $Sb_2O_3$ ingredients may be added as a refining agent. The total amount of these ingredients up to 2% will suffice.

The heat treatment is performed for achieving nucleation and crystallization of the glass and thereby improving mechanical strength the glass-ceramic obtained. If, on the other hand, the grain diameter of crystal grains produced is too large, sufficient transparency cannot be obtained. It is desirable that the grain diameter of the crystal grains obtained should be 300 Å or below. For this reason, a base glass having a composition within the above described composition range is subjected to a nucleating process and a subsequent crystallization process under proper temperatures to cause crystal grains to grow to ones of a desired grain diameter. For this purpose, the temperature used in the heat treatment must be strictly controlled. If the nucleation temperature is below 650° C. or exceeds 750° C., a desired nucleus of crystal grains cannot be obtained with resulting failure in providing desired mechanical strength. If the crystallization temperature is below 750° C. crystal grains of a desired grain diameter cannot be obtained where if the crystallization temperature exceeds 850° C., the speed of growth of crystal grains is too fast to produce uniform crystal grains with resulting decrease in transmittance and mechanical strength. A preferable nucleation temperature range is 680° C.–750° C. and a preferable crystallization temperature range is 780° C.–850 ° C.

EXAMPLES

Examples of the simulation disks made of glass and glass-ceramic for measuring flying height of a magnetic disk according to the invention will be described together with comparative examples. Tables 1 to 6 show compositions, electric resistance, abrasion and damage rate of examples (Nos. 1 to 43) of the simulation disks made of glass and glass-ceramics according to the invention as well as those of comparative examples (Comparative Examples Nos. 1 and 2).

TABLE 1

| ingredients (wt %) | Examples | | | | | | | |
|---|---|---|---|---|---|---|---|---|
| | 1 | 2 | 3 | 4 | 5 | 6 | 7 | 8 |
| $SiO_2$ | 82.3 | 82.0 | 55.0 | 57.0 | 84.5 | 6.5 | 61.8 | 60.2 |
| $Li_2O$ | 12.0 | 11.0 | 3.9 | 3.9 | 0.0 | 0.0 | 2.0 | 15.0 |
| $Na_2O$ | 0.0 | 0.0 | 0.0 | 0.0 | 2.0 | 3.0 | 0.0 | 5.0 |
| $K_2O$ | 2.5 | 2.5 | 0.0 | 0.0 | 0.0 | 0.0 | 1.0 | 5.3 |
| $P_2O_5$ | 1.7 | 1.7 | 6.0 | 8.5 | 0.0 | 0.0 | 0.0 | 0.0 |
| $B_2O_3$ | 0.0 | 0.0 | 0.0 | 0.0 | 1.5 | 11.2 | 2.2 | 0.0 |
| $Al_2O_3$ | 0.0 | 1.3 | 26.0 | 23.0 | 10.7 | 23.0 | 23.0 | 5.0 |
| MgO | 1.0 | 1.0 | 1.4 | 0.6 | 0.0 | 2.4 | 7.4 | 1.0 |
| CaO | 0.0 | 0.0 | 1.6 | 0.7 | 0.0 | 0.0 | 0.0 | 2.0 |
| SrO | 0.0 | 0.0 | 0.0 | 0.0 | 0.0 | 0.0 | 0.0 | 0.0 |
| BaO | 0.0 | 0.0 | 1.5 | 0.6 | 0.0 | 0.0 | 0.0 | 0.0 |
| ZnO | 0.0 | 0.0 | 1.0 | 0.6 | 0.0 | 3.6 | 1.6 | 0.0 |
| $TiO_2$ | 0.0 | 0.0 | 1.6 | 2.3 | 0.0 | 0.0 | 0.0 | 0.0 |
| $ZrO_2$ | 0.0 | 0.0 | 1.0 | 1.8 | 0.0 | 0.0 | 0.0 | 6.2 |
| $As_2O_3$ | 0.5 | 0.0 | 0.3 | 0.7 | 0.3 | 0.0 | 0.3 | 0.0 |
| $Sb_2O_3$ | 0.0 | 0.5 | 0.7 | 0.3 | 0.0 | 0.3 | 0.7 | 0.3 |
| $La_2O_3$ | 0.0 | 0.0 | 0.0 | 0.0 | 0.6 | 0.0 | 0.0 | 0.0 |
| $Y_2O_3$ | 0.0 | 0.0 | 0.0 | 0.0 | 0.0 | 0.0 | 0.0 | 0.0 |
| $Gd_2O_3$ | 0.0 | 0.0 | 0.0 | 0.0 | 0.4 | 0.0 | 0.0 | 0.0 |
| $Bi_2O_3$ | 0.0 | 0.0 | 0.0 | 0.0 | 0.0 | 0.0 | 0.0 | 0.0 |
| elec. resistivity ($\Omega$ cm) | $2.3 \times 10^9$ | $4.2 \times 10^9$ | $2.1 \times 10^{11}$ | $2.1 \times 10^{11}$ | $3.3 \times 10^{12}$ | $4.0 \times 10^{12}$ | $8.5 \times 10^{11}$ | $1.5 \times 10^9$ |
| abrasion damage rate | 70 ○ | 69 ○ | 60 ○ | 59 ○ | 64 ○ | 63 ○ | 64 ○ | 68 ○ |

TABLE 2

| ingredients (wt %) | Examples | | | | | | | |
|---|---|---|---|---|---|---|---|---|
| | 9 | 10 | 11 | 12 | 13 | 14 | 15 | 16 |
| $SiO_2$ | 40.5 | 41.0 | 40.5 | 40.5 | 47.5 | 54.2 | 69.0 | 79.5 |
| $Li_2O$ | 0.0 | 14.5 | 0.0 | 14.5 | 5.0 | 5.5 | 5.5 | 2.0 |
| $Na_2O$ | 29.5 | 0.0 | 0.0 | 0.0 | 0.0 | 0.0 | 0.0 | 0.0 |
| $K_2O$ | 0.0 | 0.0 | 29.5 | 0.0 | 0.0 | 0.0 | 0.0 | 0.0 |
| $P_2O_5$ | 0.0 | 0.0 | 0.0 | 14.5 | 14.5 | 0.0 | 0.0 | 0.0 |
| $B_2O_3$ | 0.0 | 0.0 | 0.0 | 0.0 | 19.5 | 0.0 | 2.0 | 2.0 |
| $Al_2O_3$ | 4.0 | 4.0 | 4.0 | 4.5 | 0.0 | 29.5 | 0.0 | 0.0 |
| MgO | 0.0 | 5.0 | 0.0 | 0.0 | 5.9 | 2.0 | 10.0 | 1.0 |
| CaO | 20.0 | 4.5 | 0.0 | 0.0 | 0.0 | 0.0 | 2.0 | 2.0 |
| SrO | 0.0 | 20.0 | 0.0 | 0.0 | 0.0 | 0.0 | 0.0 | 0.0 |
| BaO | 0.0 | 0.0 | 20.0 | 0.0 | 0.0 | 0.0 | 0.0 | 0.0 |
| ZnO | 0.0 | 5.0 | 0.0 | 20.0 | 0.0 | 0.0 | 9.0 | 0.0 |
| $TiO_2$ | 0.0 | 6.0 | 6.0 | 6.0 | 2.0 | 3.0 | 0.0 | 1.5 |
| $ZrO_2$ | 6.0 | 0.0 | 0.0 | 0.0 | 0.0 | 4.4 | 1.5 | 2.0 |
| $As_2O_3$ | 0.0 | 0.0 | 0.0 | 0.0 | 0.0 | 0.0 | 1.0 | 0.0 |
| $Sb_2O_3$ | 0.0 | 0.0 | 0.0 | 0.0 | 0.0 | 1.4 | 0.0 | 0.3 |
| $La_2O_3$ | 0.0 | 0.0 | 0.0 | 0.0 | 0.8 | 0.0 | 0.0 | 2.2 |
| $Y_2O_3$ | 0.0 | 0.0 | 0.0 | 0.0 | 1.3 | 0.0 | 0.0 | 2.0 |
| $Gd_2O_3$ | 0.0 | 0.0 | 0.0 | 0.0 | 2.1 | 0.0 | 0.0 | 5.0 |
| $Bi_2O_3$ | 0.0 | 0.0 | 0.0 | 0.0 | 1.4 | 0.0 | 0.0 | 0.5 |
| elec. resistivity ($\Omega$ cm) | $3.3 \times 10^{13}$ | $3.3 \times 10^3$ | $7.8 \times 10^{13}$ | $3.3 \times 10^8$ | $1.0 \times 10^{11}$ | $7.4 \times 10^{10}$ | $7.4 \times 10^{10}$ | $6.9 \times 10^{11}$ |
| abrasion damage rate | 80 ○ | 88 ○ | 80 ○ | 80 ○ | 75 ○ | 54 ○ | 82 ○ | 70 ○ |

TABLE 3

| ingredients (wt %) | Examples | | | | | | Comparative Example I Prior art glass disk |
|---|---|---|---|---|---|---|---|
| | 17 | 18 | 19 | 20 | 21 | 22 | |
| $SiO_2$ | 48.0 | 40.5 | 40.5 | 40.5 | 40.5 | 60.0 | 69.0 |
| $Li_2O$ | 9.0 | 2.0 | 14.0 | 14.8 | 4.8 | 0.0 | 0.0 |
| $Na_2O$ | 0.0 | 1.0 | 5.0 | 0.0 | 0.0 | 15.0 | 8.8 |
| $K_2O$ | 5.5 | 0.0 | 0.0 | 8.0 | 0.0 | 2.5 | 8.4 |
| $P_2O_5$ | 0.0 | 7.0 | 10.0 | 0.0 | 14.5 | 0.0 | 0.0 |
| $B_2O_3$ | 7.2 | 0.0 | 0.0 | 0.0 | 0.0 | 0.0 | 10.1 |
| $Al_2O_3$ | 10.0 | 4.0 | 0.0 | 1.0 | 4.5 | 15.0 | 0.0 |
| MgO | 1.0 | 0.0 | 0.0 | 0.0 | 0.0 | 0.0 | 0.0 |
| CaO | 2.0 | 29.7 | 0.0 | 0.0 | 0.0 | 0.0 | 0.0 |
| SrO | 0.0 | 0.0 | 29.5 | 0.0 | 0.0 | 0.0 | 0.0 |
| BaO | 0.0 | 0.0 | 0.0 | 29.7 | 0.0 | 0.0 | 2.8 |
| ZnO | 0.0 | 0.0 | 0.0 | 0.0 | 29.7 | 0.0 | 0.0 |
| $TiO_2$ | 3.5 | 0.0 | 0.0 | 6.0 | 6.0 | 7.0 | 0.0 |
| $ZrO_2$ | 6.0 | 6.0 | 1.0 | 0.0 | 0.0 | 0.0 | 0.0 |
| $As_2O_3$ | 0.0 | 0.0 | 0.0 | 0.0 | 0.0 | 0.0 | 1.0 |
| $Sb_2O_3$ | 0.3 | 0.0 | 0.0 | 0.0 | 0.0 | 0.5 | 0.0 |
| $La_2O_3$ | 5.0 | 5.0 | 0.0 | 0.0 | 0.0 | 0.0 | 0.0 |
| $Y_2O_3$ | 1.2 | 0.7 | 0.0 | 0.0 | 0.0 | 0.0 | 0.0 |
| $Gd_2O_3$ | 1.3 | 2.5 | 0.0 | 0.0 | 0.0 | 0.0 | 0.0 |
| $Bi_2O_3$ | 0.0 | 1.6 | 0.0 | 0.0 | 0.0 | 0.0 | 0.0 |
| elec. resistivity ($\Omega$ cm) | $2.5 \times 10^{10}$ | $8.1 \times 10^{11}$ | $9.3 \times 10^8$ | $1.3 \times 10^9$ | $1.2 \times 10^{11}$ | $2.0 \times 10^{11}$ | $2.0 \times 10^{15}$ |
| abrasion damage rate | 65 ○ | 86 ○ | 89 ○ | 87 ○ | 85 ○ | 85 ○ | 95 X |

TABLE 4

| ingredients (wt %) | Examples | | | | | | | |
|---|---|---|---|---|---|---|---|---|
| | 23 | 24 | 25 | 26 | 27 | 28 | 29 | 30 |
| $SiO_2$ | 55.0 | 54.5 | 56.0 | 57.0 | 55.0 | 54.2 | 55.0 | 48.2 |
| $Li_2O$ | 3.9 | 3.5 | 3.9 | 3.9 | 4.0 | 4.0 | 4.0 | 9.8 |
| $P_2O_5$ | 6.0 | 6.5 | 8.0 | 8.5 | 8.0 | 7.5 | 8.0 | 9.5 |
| $Al_2O_3$ | 26.0 | 25.0 | 24.0 | 23.0 | 24.0 | 24.5 | 24.0 | 24.0 |
| MgO | 1.4 | 1.5 | 0.8 | 0.6 | 1.0 | 1.2 | 0.8 | 1.3 |
| CaO | 1.6 | 2.0 | 1.0 | 0.7 | 1.0 | 1.2 | 1.2 | 1.2 |
| BaO | 1.5 | 1.1 | 0.7 | 0.6 | 1.0 | 1.2 | 1.0 | 0.5 |
| ZnO | 1.0 | 1.4 | 0.6 | 0.6 | 0.5 | 0.7 | 0.5 | 0.5 |
| $TiO_2$ | 1.6 | 1.8 | 2.2 | 2.3 | 2.5 | 2.5 | 2.5 | 4.5 |
| $ZrO_2$ | 1.0 | 1.7 | 1.8 | 1.8 | 2.0 | 2.0 | 2.0 | 0.0 |
| $As_2O_3$ | 0.0 | 0.0 | 1.0 | 0.8 | 0.6 | 0.4 | 0.5 | 0.5 |
| $Sb_2O_3$ | 1.0 | 1.0 | 0.0 | 0.2 | 0.4 | 0.6 | 0.5 | 0.5 |
| elec. resistivity ($\Omega$ cm) | $4.8 \times 10^{11}$ | $9.2 \times 10^{11}$ | $4.8 \times 10^{11}$ | $4.8 \times 10^{11}$ | $4.1 \times 10^{11}$ | $4.1 \times 10^{11}$ | $4.1 \times 10^{11}$ | $1.1 \times 10^8$ |
| abrasion damage rate | 50 ○ | 52 ○ | 53 ○ | 54 ○ | 53 ○ | 52 ○ | 53 ○ | 54 ○ |

TABLE 5

| ingredients (wt %) | Examples | | | | | | | |
|---|---|---|---|---|---|---|---|---|
| | 31 | 32 | 33 | 34 | 35 | 36 | 37 | 38 |
| $SiO_2$ | 48.2 | 64.5 | 60.0 | 50.0 | 62.6 | 60.8 | 48.0 | 53.0 |
| $Li_2O$ | 9.8 | 8.0 | 4.0 | 4.0 | 2.0 | 7.0 | 3.0 | 4.0 |
| $P_2O_5$ | 9.5 | 5.0 | 8.0 | 15.0 | 0.0 | 3.6 | 7.0 | 8.0 |
| $Al_2O_3$ | 24.0 | 15.0 | 19.5 | 20.0 | 21.7 | 21.7 | 28.0 | 16.5 |
| MgO | 0.8 | 1.0 | 1.0 | 0.0 | 1.8 | 0.0 | 5.0 | 6.0 |
| CaO | 1.2 | 0.5 | 0.8 | 0.0 | 4.0 | 0.0 | 2.5 | 4.5 |

TABLE 5-continued

| ingredients (wt %) | Examples | | | | | | | |
|---|---|---|---|---|---|---|---|---|
| | 31 | 32 | 33 | 34 | 35 | 36 | 37 | 38 |
| BaO | 0.5 | 1.0 | 0.2 | 0.0 | 0.0 | 0.0 | 5.0 | 5.5 |
| ZnO | 0.0 | 0.5 | 1.1 | 0.0 | 6.0 | 5.0 | 0.0 | 0.0 |
| $TiO_2$ | 0.5 | 2.5 | 1.7 | 7.0 | 0.0 | 0.0 | 0.0 | 0.0 |
| $ZrO_2$ | 4.5 | 0.5 | 1.7 | 3.0 | 0.0 | 0.0 | 1.5 | 1.5 |
| $As_2O_3$ | 0.0 | 0.5 | 0.0 | 0.0 | 1.9 | 0.0 | 0.0 | 0.0 |
| $Sb_2O_3$ | 1.0 | 1.0 | 2.0 | 1.0 | 0.0 | 1.9 | 0.0 | 1.0 |
| elec. resistivity ($\Omega$ cm) | $1.1 \times 10^8$ | $2.3 \times 10^9$ | $4.1 \times 10^{11}$ | $4.1 \times 10^{11}$ | $1.2 \times 10^{13}$ | $1.0 \times 10^{10}$ | $2.2 \times 10^{12}$ | $4.1 \times 10^{11}$ |
| abrasion | 54 | 66 | 60 | 59 | 57 | 57 | 49 | 66 |
| damage rate | ○ | ○ | ○ | ○ | ○ | ○ | ○ | ○ |

TABLE 6

| ingredients (wt %) | Examples | | | | | Comparative Example 2 quartz glass |
|---|---|---|---|---|---|---|
| | 39 | 40 | 41 | 42 | 43 | |
| $SiO_2$ | 53.0 | 53.0 | 48.0 | 55.0 | 55.0 | 100.0 |
| $Li_2O$ | 4.0 | 4.0 | 8.0 | 7.0 | 7.0 | — |
| $P_2O_5$ | 8.0 | 8.0 | 2.0 | 7.1 | 7.1 | — |
| $Al_2O_3$ | 16.5 | 16.5 | 29.0 | 20.0 | 20.0 | — |
| MgO | 8.0 | 0.0 | 0.0 | 0.8 | 1.2 | — |
| CaO | 5.0 | 0.0 | 1.0 | 1.0 | 1.0 | — |
| BaO | 2.0 | 7.0 | 0.0 | 1.2 | 0.8 | — |
| ZnO | 0.0 | 8.0 | 1.0 | 0.5 | 0.5 | — |
| $TiO_2$ | 0.0 | 0.0 | 2.0 | 5.9 | 0.5 | — |
| $ZrO_2$ | 1.5 | 1.5 | 7.0 | 0.5 | 5.9 | — |
| $As_2O_3$ | 0.0 | 0.0 | 0.0 | 0.0 | 0.0 | — |
| $Sb_2O_3$ | 2.0 | 2.0 | 2.0 | 1.0 | 1.0 | — |
| elec. resistivity ($\Omega$ cm) | $4.1 \times 10^{11}$ | $4.1 \times 10^{11}$ | $2.3 \times 10^9$ | $1.0 \times 10^{10}$ | $1.0 \times 10^{10}$ | $1.0 \times 10^{19}$ |
| abrasion | 66 | 66 | 45 | 59 | 59 | 59.0 |
| damage rate | ○ | ○ | ○ | ○ | ○ | X |

Examples 1 to 22

Tables 1 to 3 show examples of the simulation disk made of glass according to the invention. Materials of glass were weighed so that, glass obtained would have a composition described in the Tables and were subjected to a general glass production process including melting, refining, stirring and forming. Then, the formed glass was lapped and polished to form a simulation disk for measuring flying height of a magnetic head. The simulation disk made of glass thus obtained was mounted on a magnetic head flying height measuring device to measure damage rate of the magnetic head. The damage rate was expressed by ○ and X marks in the Tables. The mark ○ represents that the frequency of damage to the magnetic head is smaller than that of the comparative examples and the mark X represents that the frequency of damage to the magnetic head is about equal to that of the comparative examples. Electric resistivity was measured in accordance with the method of JIS-K6911. Abrasion was measured in accordance with the method JOGIS 10-1994 for measuring abrasion of optical glass which has been determined by the Japanese Optical Glass Industrial Standards.

Examples 23 to 43

Tables 4 to 6 show examples of the simulation disk made of glass-ceramic according to the invention. Materials of glass were weighed so that the glass-ceramic obtained would have a composition described in the Tables. The materials were subjected to a general glass-ceramic production process including melting, refining, stirring, forming and heat treatment. Then, the glass-ceramic obtained was lapped and polished to form a simulation glass for measuring flying height of a magnetic disk. The heat treatment was conducted with the nucleation temperature at 660° C. for 40 hours and the crystallization temperature at 760° C. for 40 hours. The simulation disk made of glass-ceramic thus obained was mounted on a magnetic disk flying height measuring device to measure damage rate of the magnetic head in the same manner as in Examples 1 to 22. The damage rate is expressed by the marks ○ and X in the same manner as in Examples 1 to 22. Electric resistivity was measured in accordance with the method JIS-K6911 and abrasion was measured in accordance with the method JOGIS 10-1994.

Comparative Examples 1 and 2

A transparent simulation glass having electric resistivity of $10^{15}$ $\Omega$cm disclosed in Japanese Patent Application Laid-open No. Hei 3-3177 (Comparative Example 1) and a simulation disk made of quartz having electric resistance of $10^{19}$ $\Omega$cm were prepared and subjected to the same measurement made with respect to Example 1.

Results

As will be apparent from Tables 1 to 6, the simulation disks for measuring flying height of a magnetic disk made according to the invention have electric resistance which is smaller by three to five figures than the prior art simulation disk. The simulation disks of the invention have also a value of abrasion which is smaller than the prior art simulation disk and is nearly equal to the disk made of quartz. As to the damage rate, the simulation disks of the invention have a smaller damage rate than the prior art simulation disk which demonstrates that the simulation disk is more suitable for measuring flying height of a magnetic disk.

As described in the foregoing, the simulation disk for measuring flying height of a magnetic disk made according to the present invention is provided with transmittance and optical homogeneity equal to the prior art simulation disk without requiring the complex process of forming a thin film and has excellent mechanical strength and resistance to abrasion in the measurement of flying height. The simulation disk of the present invention has also proper electric resistivity so that it can prevent deposition of dust due to accumulation of electric charge and prevent crash of the magentic head occurring due to flow of current when the magnetic head comes into contact with the simulation disk. Thus, according to the invention, a simulation disk for measuring flying height of a magnetic disk which is superior to the prior art simulation disks can be obtained.

Further, since electric charge accumulated on the disk surface of the simulation disk made according to the invention is by far smaller than that of the prior art simulation disk, the Coulomb's force acting between the magnetic head and the simulation disk is reduced whereby an error in the measurement of flying height occurring due to the Coulomb's force is reduced and frequency of crash of the magnetic head against the simulation disk is also reduced. Accordingly, the simulation disk of the invention is not adversely affected by the Coulomb's force even at an extremely low flying height necessitated by increase in the recording density and therefore can produce, at such a low flying height, an accurate result of measurement of flying height without causing damage to the magnetic head.

What is claimed is:

1. A simulation disk for measuring flying height of a magnetic head comprising a $SiO_2$—$R_2O$ (where R is Li, Na or K) glass or glass-ceramic having electric resistivity of $10^8$–$10^{14}$ Ωcm and abrasion of 90 or below.

2. A simulation disk for measuring flying height of a magnetic head made of glass consisting in weight percent of:

| | |
|---|---|
| $SiO_2$ | 40–85% |
| $R_2O$ (R being Li, Na or K) | 2–30% |
| $P_2O_5$ | 0–15% |
| $B_2O_3 + Al_2O_3$ | 0–35% |
| R'O (R' being Mg, Ca, Sr. Ba, Zn or Pb) | 0–35% |
| $TiO_2 + ZrO_2$ | 0–10% |
| $As_2O_3 + Sb_2O_3$ | 0–2% |
| $La_2O_3 + Y_2O_3 + Gd_2O_3\ Bi_2O_3$ | 0–10% | and having electric resistivity of $10^8$ Ωcm to $10^{14}$ Ωcm and abrasion of 90 or below.

3. A simulation disk for measuring flying height of a magnetic head made of a transparent glass-ceramic consisting in weight percent of:

| | |
|---|---|
| $SiO_2$ | 48–65% |
| $P_2O_5$ | 0–15% |
| where $SiO_2 + P_2O_5$ | 50–70% |
| $Al_2O_3$ | 15–30% |
| $Li_2O$ | 2–10% |
| MgO | 0–8% |
| ZnO | 0–8% |
| CaO | 0–8% |
| BaO | 0–7% |
| $TiO_2$ | 0–7% |
| $ZrO_2$ | 0–7% |
| where $TiO_2 + ZrO_2$ | 0.5–10% |
| $As_2O_3 + Sb_2O_3$ | 0–2% | and having electric resistivity of $10^8$ Ωcm to $10^{13}$ Ωcm and abrasion of 75 or below.

4. A simulation disk for measuring flying height of a magnetic head as defined in claim 3 made of a transparent glass-ceramic obtained by melting glass materials of said composition, forming and annealing a molten glass and heat treating the molten glass for nucleation under a temperature within a range from 650° C. to 750° C. and for subsequent crystallization under a temperature within a range from 750° C. to 850° C. said glass-ceramic having electric resistivity of $10^8$ Ωcm to $10^{13}$ Ωcm and abrasion of 75 or below.

* * * * *